(12) United States Patent
Lin et al.

(10) Patent No.: US 12,486,918 B2
(45) Date of Patent: Dec. 2, 2025

(54) TWO-WAY ANGLE VALVE CAPABLE OF BUFFERING DEFLATION

(71) Applicant: KING LAI HYGIENIC MATERIALS CO., LTD., Zhubei (TW)

(72) Inventors: Cheng-Chi Lin, Taichung (TW); Chiao-Wen Lin, Taichung (TW)

(73) Assignee: KING LAI HYGIENIC MATERIALS CO., LTD, Hsinchu County (TW)

( * ) Notice: Subject to any disclaimer, the term of this patent is extended or adjusted under 35 U.S.C. 154(b) by 125 days.

(21) Appl. No.: 18/627,144

(22) Filed: Apr. 4, 2024

(65) Prior Publication Data

US 2025/0283546 A1    Sep. 11, 2025

(30) Foreign Application Priority Data

Mar. 8, 2024 (TW) ................................ 113108501

(51) Int. Cl.
*F16K 17/30* (2006.01)
*F16K 41/02* (2006.01)

(52) U.S. Cl.
CPC .............. *F16K 17/30* (2013.01); *F16K 41/02* (2013.01)

(58) Field of Classification Search
CPC .......... F16K 17/30; F16K 41/02; F16K 41/10; F16K 31/1225; Y10T 137/87378; Y10T 137/86944; Y10T 137/87499
See application file for complete search history.

(56) References Cited

U.S. PATENT DOCUMENTS

| | | | | |
|---|---|---|---|---|
| 4,041,979 A | * | 8/1977 | Grotloh | F16K 1/44 137/601.13 |
| 4,041,980 A | * | 8/1977 | Grotloh | F16K 31/363 137/599.16 |
| 5,172,722 A | * | 12/1992 | Nishimura | F16K 39/024 137/601.13 |
| 5,848,608 A | * | 12/1998 | Ishigaki | F16K 41/10 251/60 |

(Continued)

FOREIGN PATENT DOCUMENTS

| | | | | |
|---|---|---|---|---|
| CN | 116817003 A | | 9/2023 | |
| DE | 3738071 A1 | * | 5/1988 | ............. F16K 17/04 |
| TW | I551797 B | | 10/2016 | |

*Primary Examiner* — Jessica Cahill
(74) *Attorney, Agent, or Firm* — Birch, Stewart, Kolasch & Birch, LLP

(57) ABSTRACT

A two-way angle valve capable of buffering deflation includes: a body having an inlet and an outlet; a drive cylinder coupled to the body; a main piston having therein an auxiliary drive cavity; a drive air duct; an auxiliary piston driven to be vertically movably disposed in the auxiliary drive cavity; an auxiliary spring; a stem fixedly disposed at the auxiliary piston and having an auxiliary disc; a main disc having a chamber, deflation buffering duct and deflation buffering hole; and a main spring. The stem is inserted into the main disc such that the auxiliary disc is vertically movably disposed in the chamber. The deflation buffering duct has one end in communication with the chamber and the other end defined as an opening formed at the main disc laterally. Therefore the deflation buffering duct and deflation buffering hole are in communication with the outlet and inlet respectively.

7 Claims, 7 Drawing Sheets

(56) References Cited

U.S. PATENT DOCUMENTS

| | | | |
|---|---|---|---|
| 11,384,864 B2* | 7/2022 | Yamada | F16K 1/523 |
| 2004/0007682 A1* | 1/2004 | Kajitani | F16K 31/1221 |
| | | | 251/63.6 |
| 2010/0193717 A1* | 8/2010 | Tanikawa | F16K 41/10 |
| | | | 137/341 |

* cited by examiner

TWO-WAY ANGLE VALVE CAPABLE OF BUFFERING DEFLATION

BACKGROUND OF THE INVENTION

1. Field of the Invention

The present disclosure relates to angle valves, and more particularly to a two-way angle valve capable of buffering deflation.

2. Description of Related Art

Taiwan patent 1551797 discloses a two-way angle valve with an airtight disc and a first channel. The airtight disc undergoes stroke control to reach a first distance and a second distance relative to the first channel, thereby controlling gas flow rate by ensuring that the first distance is less than the second distance. However, Taiwan patent 1551797 has a drawback. The aforesaid controlling the gas flow rate by controlling the extent of the stroke of the airtight disc does not make a significant difference in the gas flow rate between the first distance and the second distance for the reason explained below. Different strokes but the same area of the open airtight disc exist at the first distance and the second distance. The gas flow rate is already high during the time period from the point in time when the airtight disc is opened to the point in time of the first distance, and in consequence the difference in the gas flow rate will not vary significantly even if the airtight disc is opened further to reach the second distance.

China patent 116817003A discloses a two-way angle valve that improves the prior art and comprises a main disc and an auxiliary disc. The main disc and the auxiliary disc open separately to controllably cause a main inlet and an auxiliary inlet to open or shut. The auxiliary inlet has a smaller diameter than the main inlet. The auxiliary inlet is opened to let a small amount of gas in, and then the main inlet is opened to let a large amount of gas in, buffering gas admission. However, China patent 116817003A has a drawback. The two-way angle valve has a main stem and an auxiliary stem which have to be driven by a drive mechanism each. Specifically speaking, the main stem is driven by a main piston, and the auxiliary stem is driven by an auxiliary piston; doing so, however, requires fitting the auxiliary stem inside the main stem, requires keeping their movement smooth and independent of each other, and requires maintaining airtightness with an O-ring. As a result, the two-way angle valve is structurally complicated and difficult to assemble, not to mention that some components of the two-way angle valve fail to operate smoothly. Furthermore, gas may seep into the auxiliary disc and come into contact with an auxiliary resilient storing element. If the gas is corrosive, the auxiliary resilient storing element may be corroded, causing a failure of the two-way angle valve.

BRIEF SUMMARY OF THE INVENTION

It is an objective of the disclosure to provide a two-way angle valve capable of buffering deflation.

Another objective of the disclosure is to provide a two-way angle valve capable of buffering deflation, using a stem to drive an auxiliary disc and a main disc separately to not only achieve structural simplicity and ease of assembly but also ensure that all the components of the two-way angle valve operate smoothly.

To achieve the above and other objectives, the disclosure provides a two-way angle valve capable of buffering deflation, comprising: a body having an inlet disposed below and an outlet disposed laterally; a drive cylinder coupled to the body and disposed on the body; a main piston driven to be vertically movably disposed in the drive cylinder, wherein an auxiliary drive cavity is concavely disposed at the main piston and extends in a top-to-bottom direction; a drive air duct not only disposed at the drive cylinder so as to be in communication with the inside of the drive cylinder but also externally connected to a controlled gas source; an auxiliary piston driven to be vertically movably disposed in the auxiliary drive cavity; an auxiliary spring disposed in the drive cylinder, having two ends abutting against the drive cylinder and the auxiliary piston respectively, and generating a resilient restoring force under which the auxiliary piston is moved downward; a stem having a top end fixedly disposed at the auxiliary piston, extending downward by a predetermined length, and moving vertically together with the auxiliary piston to penetrate the main piston and the drive cylinder to thereby move into the body, wherein an auxiliary disc is disposed at the bottom end of the stem; an auxiliary drive air duct comprising an auxiliary channel penetrating the drive cylinder, a gap defined between the stem and the drive cylinder, and a stem air duct disposed in the stem, wherein the auxiliary channel, the gap, and the stem air duct are in communication with each other, the stem air duct being in communication with the inside of the auxiliary drive cavity, and the auxiliary channel being externally connected to an auxiliary controlled gas source; a main disc having a chamber and a deflation buffering duct, the main disc having an upper abutting portion and a lower abutting portion, the upper abutting portion being disposed above the chamber, the lower abutting portion being disposed below the chamber and having a deflation buffering hole, the stem being inserted into the main disc to allow the auxiliary disc to be vertically movably disposed in the chamber, the deflation buffering duct having one end being in communication with the chamber and the other end being defined as an opening formed on a lateral side of the main disc, thereby allowing the deflation buffering duct to be in communication with the outlet, and the deflation buffering hole being in communication with the inlet; and a main spring disposed in the body, fitted around the stem, having two ends abutting against the drive cylinder and the main disc respectively, and generating a resilient restoring force under which the main disc is moved downward, wherein the stem and the auxiliary disc move because of vertical movement of the auxiliary piston, wherein movement of the auxiliary piston and the main piston causes the stem to move between a lowest position and a highest position, wherein when the stem is at the lowest position, the auxiliary disc abuts against the lower abutting portion of the chamber to close the deflation buffering hole, and the main disc abuts against the body to close the inlet, disabling communication of the inlet and the outlet, wherein when the auxiliary disc has separated from the lower abutting portion but has not yet abutted against the upper abutting portion during an ascent of the stem from the lowest position, the outlet is in communication with the inlet through the deflation buffering duct, the chamber and the deflation buffering hole, wherein when the stem is at the highest position, the auxiliary disc abuts against the upper abutting portion of the chamber, and the main disc is lifted such that the inlet is not closed, enabling the communication of the inlet and the outlet.

Owing to the aforesaid technical features, the two-way angle valve of the disclosure not only achieves deflation buffering but also uses a stem to drive an auxiliary disc and a main disc separately to achieve structural simplicity and ease of assembly and ensure that all the components of the two-way angle valve operate smoothly.

DETAILED DESCRIPTION OF THE INVENTION

Figure 1:
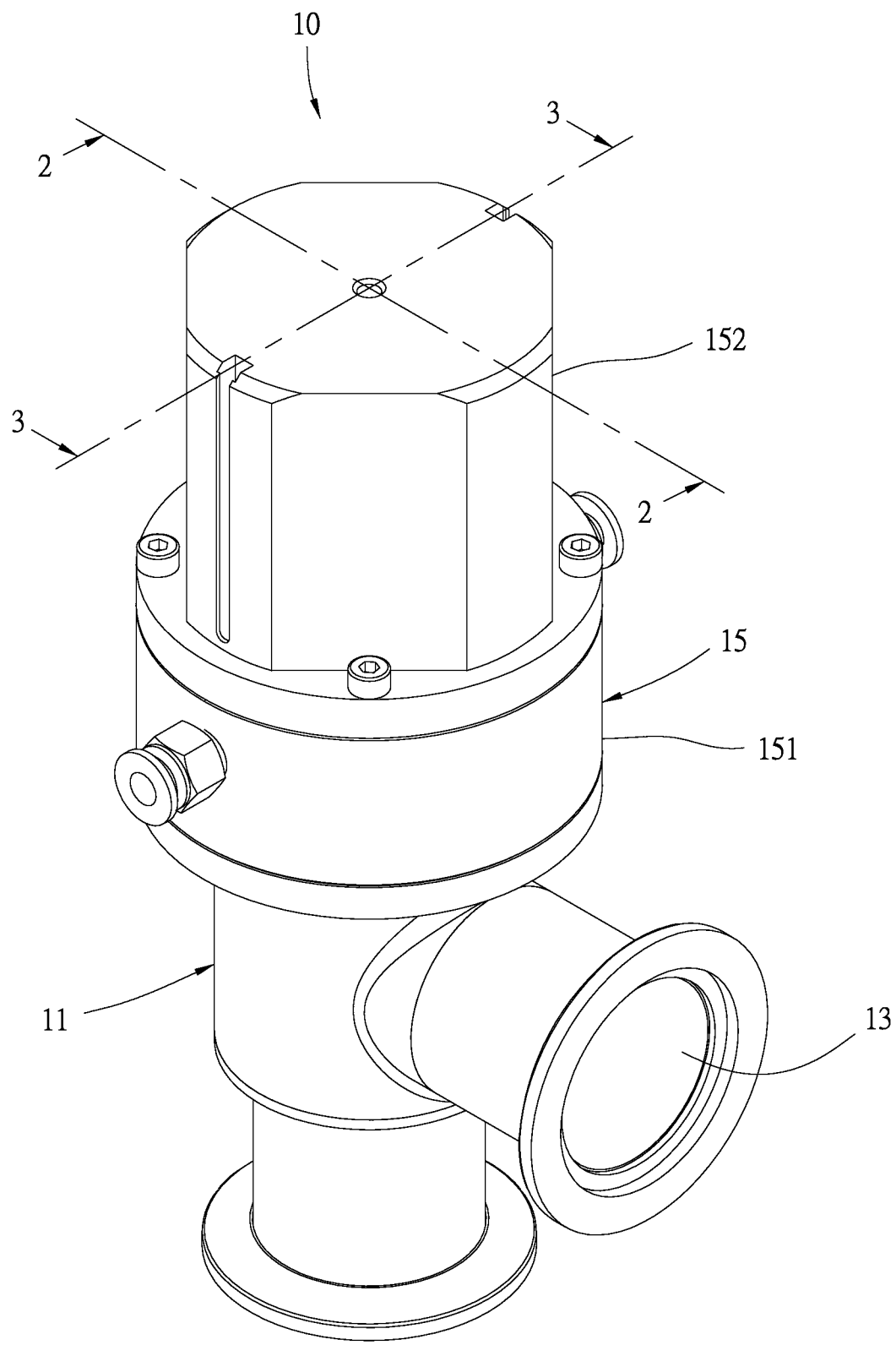
FIG. 1 is a perspective view of a preferred embodiment of the disclosure.

Technical features of the disclosure are herein illustrated with preferred embodiments, depicted with drawings, and described below.

As shown in FIG. 1 through FIG. 7, a preferred embodiment of the disclosure provides a two-way angle valve 10 capable of buffering deflation essentially comprising a body 11, a drive cylinder 15, a main piston 21, a drive air duct 25, an auxiliary piston 31, an auxiliary spring 35, a stem 41, an auxiliary drive air duct 45, a main disc 51 and a main spring 55.

An inlet 12 is disposed below the body 11. An outlet 13 is disposed beside the body 11.

The drive cylinder 15 is coupled to the body 11 and disposed on the body 11. In practice, to facilitate processing and production, the drive cylinder 15 comprises a lower block 151 and an upper cylinder 152 fitted together. The body 11 is disposed at the lower block 151. A drive cavity 153 is formed between the upper cylinder 152 and the lower block 151.

The main piston 21 is driven to be vertically movably disposed in the drive cavity 153 of the drive cylinder 15. An auxiliary drive cavity 213 is concavely disposed at the main piston 21 and extends in a top-to-bottom direction.

The drive air duct 25 is disposed at the drive cylinder 15 and thus is in communication with the inside of the drive cylinder 15. The drive air duct 25 is externally connected to a controlled gas source 91. In practice, the drive air duct 25 is disposed at the lower block 151.

The auxiliary piston 31 is driven to be vertically movably disposed in the auxiliary drive cavity 213.

The auxiliary spring 35 is disposed in the drive cavity 153 of the drive cylinder 15. Two ends of the auxiliary spring 35 abut against the upper cylinder 152 and the auxiliary piston 31 respectively. The auxiliary spring 35 generates a resilient restoring force under which the auxiliary piston 31 is moved downward.

The top end of the stem 41 is fixedly disposed at the auxiliary piston 31, extends downward by a predetermined length to penetrate the lower block 151, and moves vertically together with the auxiliary piston 31 to penetrate the main piston 21 and the drive cylinder 15 and thereby move into the body 11. An auxiliary disc 42 is disposed at the bottom end of the stem 41.

The auxiliary drive air duct 45 comprises an auxiliary channel 451 penetrating the drive cylinder 15, a gap G defined between the stem 41 and the drive cylinder 15, and a stem air duct 411 disposed in the stem 41. The auxiliary channel 451, the gap G, and the stem air duct 411 are in communication with each other. The stem air duct 411 is in communication with the inside of the auxiliary drive cavity 213. The auxiliary channel 451 is externally connected to an auxiliary controlled gas source 92. In this embodiment, the auxiliary channel 451 is disposed at the lower block 151 for exemplary purposes.

The main disc 51 has a chamber 52 and a deflation buffering duct 53. The main disc 51 has an upper abutting portion 511 and a lower abutting portion 512 which are disposed above and below the chamber 52 respectively. The lower abutting portion 512 has a deflation buffering hole 513. The stem 41 is inserted into the main disc 51 to allow the auxiliary disc 42 to be vertically movably disposed in the chamber 52. The deflation buffering duct 53 has one end being in communication with the chamber 52 and the other end being defined as an opening formed on a lateral side of the main disc 51. The deflation buffering duct 53 is in communication with the outlet 13, and the deflation buffering hole 513 is in communication with the inlet 12. In this embodiment, the diameter of the deflation buffering duct 53 is configured to be less than the diameter of the inlet 12, and the diameter of the deflation buffering hole 513 is also configured to be less than the diameter of the inlet 12, ensuring that the deflation buffering duct 53 and the deflation buffering hole 513 are of diameters small enough to admit a working gas at a low flow rate and thereby buffer the atmospheric pressure difference between the inlet 12 and the outlet 13.

The main spring 55 is disposed in the body 11 and fitted around the stem 41. The main spring 55 has two ends abutting against the drive cylinder 15 and the main disc 51 respectively and generates a resilient restoring force under which the main disc 51 is moved downward. If the two-way angle valve 10 capable of buffering deflation is used in an environment with a working gas being corrosive, this embodiment further provides a resilient sealing pipe 56 with two ends connected to the main disc 51 and the body 11 respectively to cover the stem 41 and the main spring 55, insulating the main spring 55 from the corrosive working gas.

The stem 41 and the auxiliary disc 42 move because of the vertical movement of the auxiliary piston 31. In practice, the lower block 151 has an upper seal ring S1 and a lower seal ring S2 and is slidably fitted to the stem 41 so as to allow the position of communication of the auxiliary channel 451 and the gap G to stay between the upper seal ring S1 and the lower seal ring S2 and allow the position of communication of the stem air duct 411 and the gap G to stay between the upper seal ring S1 and the lower seal ring S2 regardless of how the stem 41 moves.

The movement of the auxiliary piston 31 and the main piston 21 causes the stem 41 to move between a lowest position LP and a highest position HP. When the stem 41 is at the lowest position LP, the auxiliary disc 42 abuts against the lower abutting portion 512 of the chamber 52 to close the deflation buffering hole 513, and the main disc 51 abuts against the body 11 to close the inlet 12, disabling the communication of the inlet 12 and the outlet 13. When the auxiliary disc 42 has separated from the lower abutting portion 512 but has not yet abutted against the upper abutting portion 511 during an ascent of the stem 41 from the lowest position LP, the outlet 13 is in communication with the inlet 12 through the deflation buffering duct 53, the chamber 52 and the deflation buffering hole 513. When the stem 41 is at the highest position HP, the auxiliary disc 42 abuts against the upper abutting portion 511 of the chamber 52, and the main disc 51 is lifted such that the inlet 12 is not closed, enabling the communication of the inlet 12 and the outlet 13.

The structural features of this embodiment are described above. The operation of this embodiment is described below. The operation of this embodiment falls into three categories, namely shut, buffered opening and fully opened, and a gas inside the inlet 12 of the body 11 is defined as a working gas.

Figure 2:
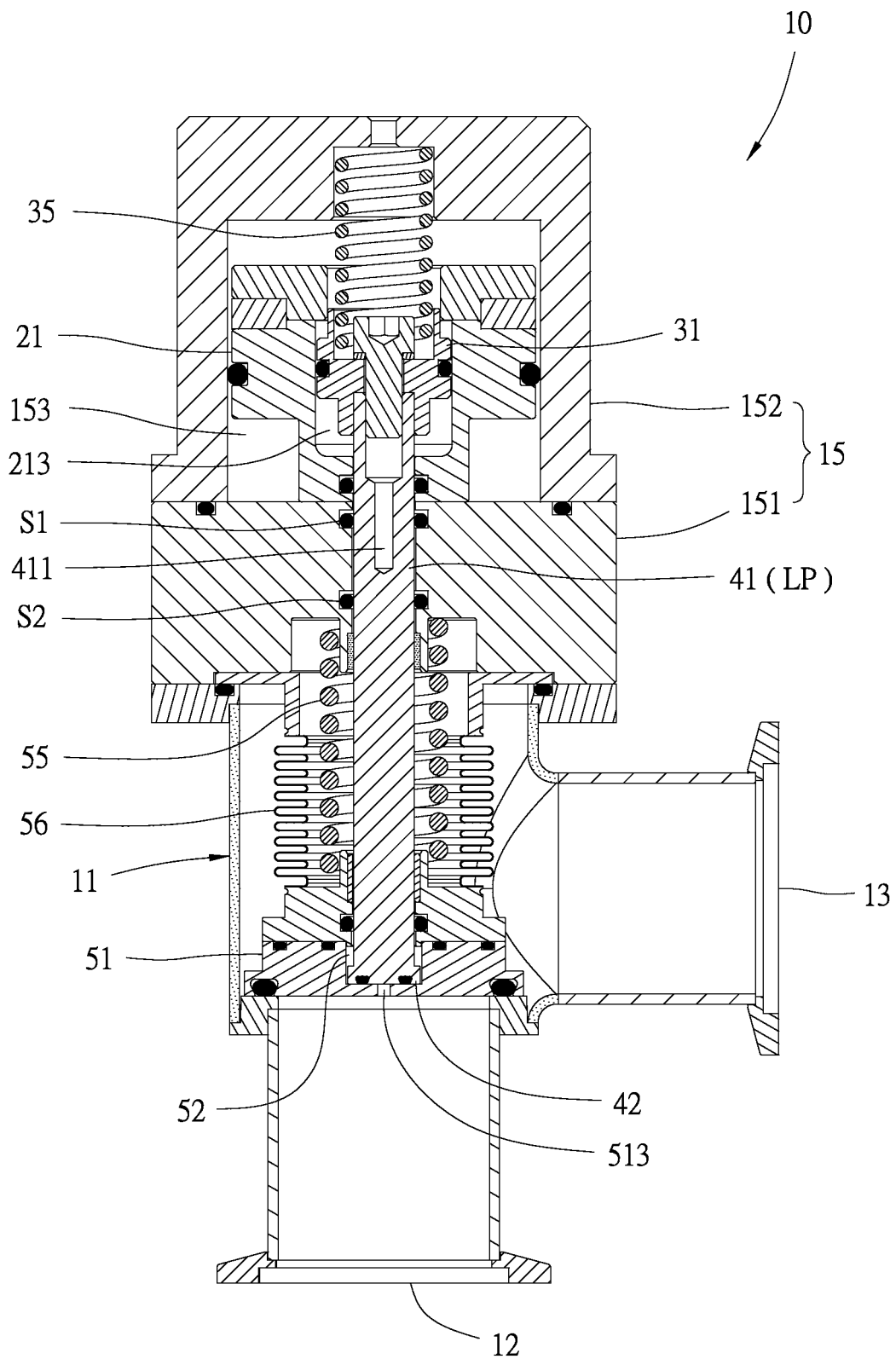
FIG. 2 is a cross-sectional view taken along line 2-2 of FIG. 1.
Figure 3:
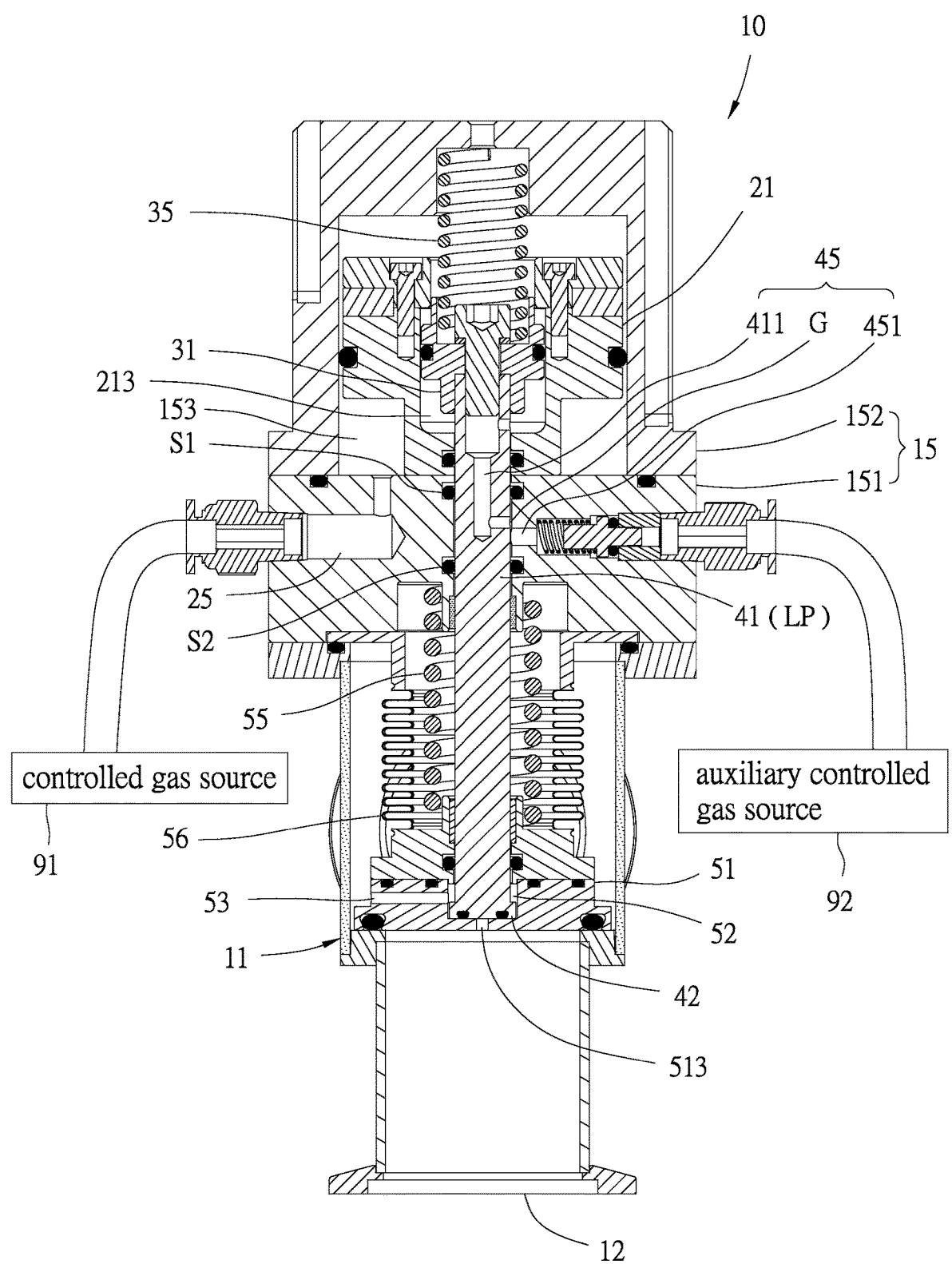
FIG. 3 is a cross-sectional view taken along line 3-3 of FIG. 1.
Figure 4:
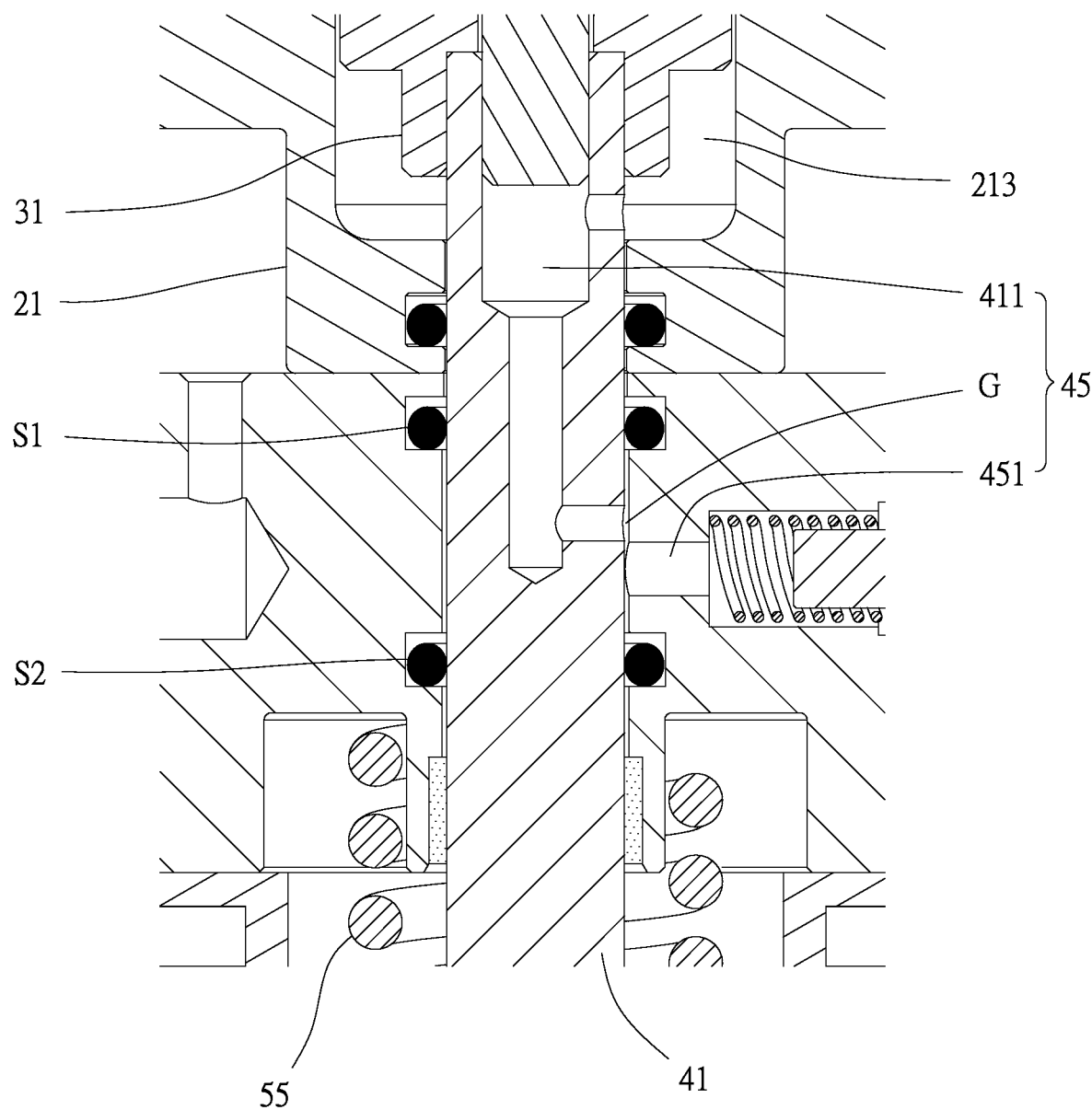
FIG. 4 is a partial enlarged view of FIG. 3.

As shown in FIG. 2 and FIG. 3, in the shut state, the stem 41 is at the lowest position LP to allow the inlet 12 to be closed by the main disc 51 and allow the deflation buffering hole 513 to be closed by the auxiliary disc 42.

Figure 5:
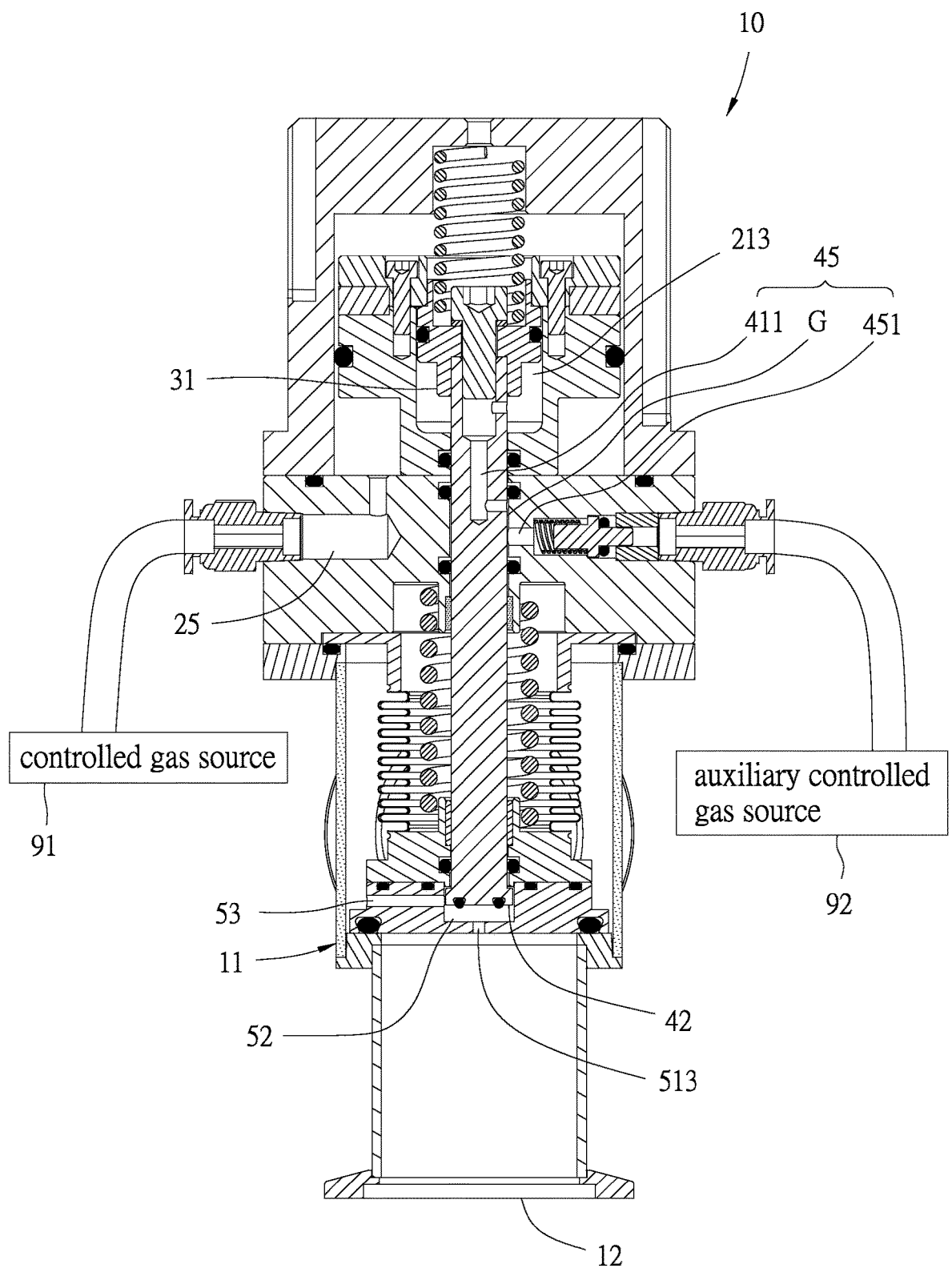
FIG. 5 is a cross-sectional view of operation of a preferred embodiment of the disclosure.
Figure 6:
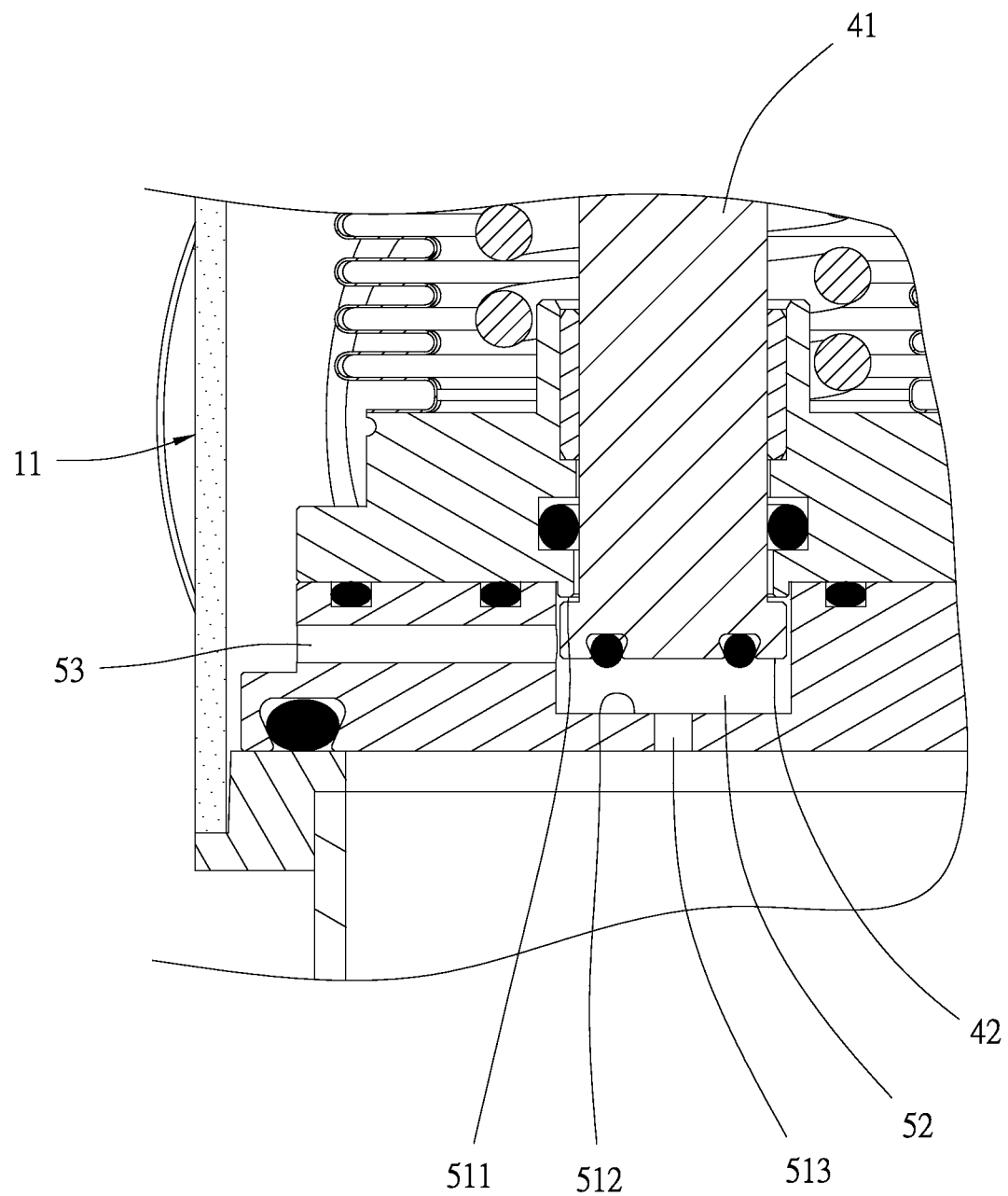
FIG. 6 is a partial enlarged view of FIG. 5.

As shown in FIG. 5, performing buffered opening in the shut state entails the following: a driving gas is provided to the auxiliary drive air duct 45 by the auxiliary controlled gas source 92, and then the driving gas enters the auxiliary drive cavity 213 to drive the auxiliary piston 31 moving upward relative to the main piston 21; thus, the stem 41 is lifted together with the auxiliary piston 31, causing the auxiliary disc 42 to rise and no longer close the deflation buffering hole 513. At this point in time, as shown in FIG. 6, the working gas in the inlet 12 of the body 11 enters the chamber 52 via the deflation buffering hole 513 and then is discharged from the deflation buffering duct 53 to reach the outlet 13. With the deflation buffering duct 53 being of a smaller diameter than the inlet 12, and the deflation buffering hole 513 being of a smaller diameter than the inlet 12, only a small amount of the working gas flows from the inlet 12 to the outlet 13.

Figure 7:
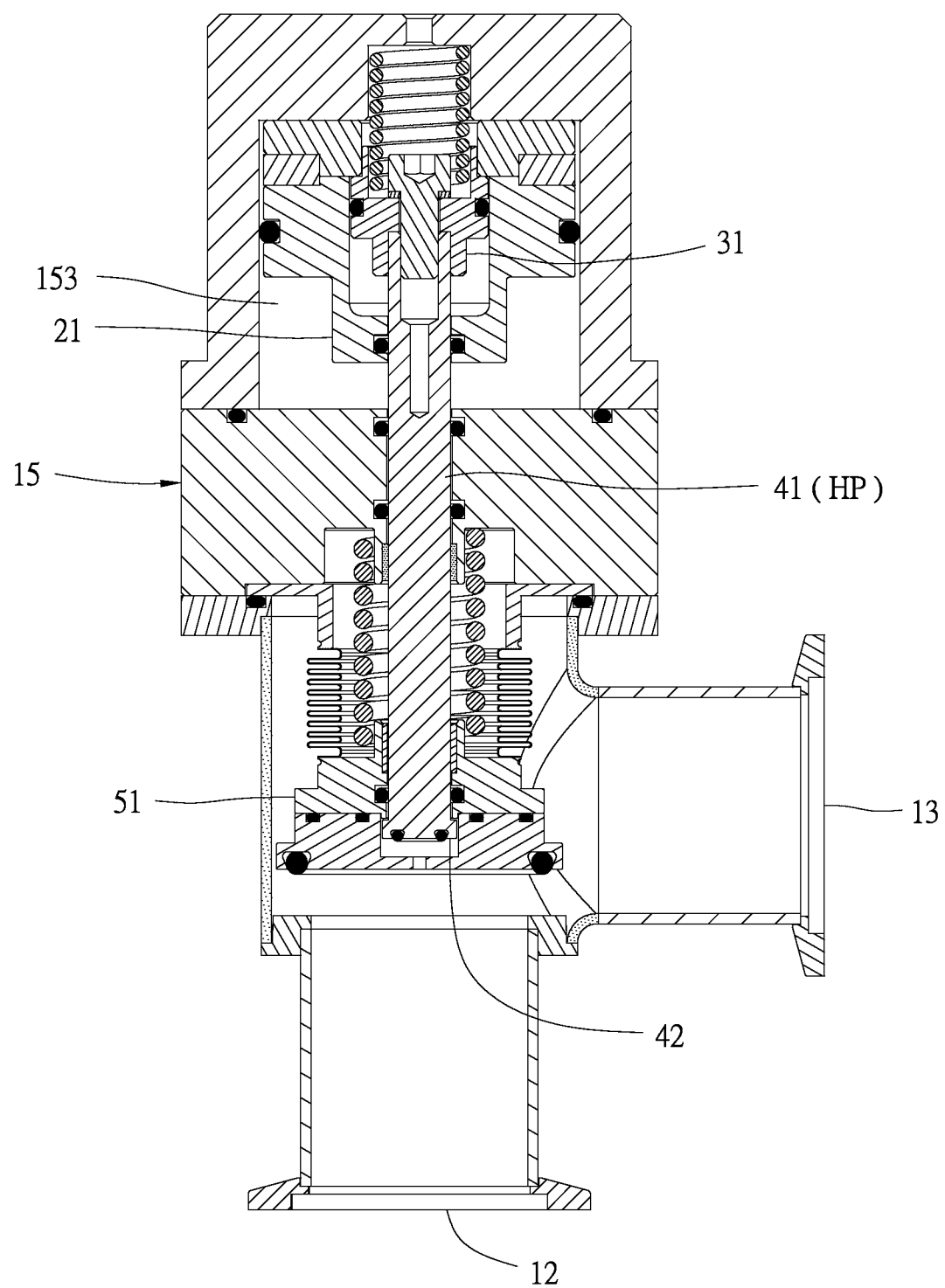
FIG. 7 is another cross-sectional view of operation of a preferred embodiment of the disclosure.

As shown in FIG. 7, the aforesaid operation is followed by the process of exiting the buffered opening state to enter the fully opened state, after the auxiliary piston 31 has risen to reach a predetermined height, the controlled gas source 91 (shown in FIG. 5) provides the drive gas to the drive air duct 25 such that the drive gas enters the drive cavity 153 to drive the main piston 21 rising relative to the drive cylinder 15. Thus, the auxiliary piston 31 rises together with the main piston 21 such that the stem 41 and the auxiliary disc 42 rise. Therefore, the auxiliary disc 42 abuts against the upper abutting portion 511 (shown in FIG. 6) to lift the main disc 51 and stop the main disc 51 from closing the inlet 12, allowing the working gas to flow from the inlet 12 to the outlet 13.

As shown in FIG. 3, returning to the shut state entails the following: controllably causing the controlled gas source 91 and the auxiliary controlled gas source 92 to absorb the driving gas, whereas the main disc 51 and the auxiliary disc 42 are pushed downward under the resilient restoring force of the main spring 55 and the auxiliary spring 35, causing the main piston 21 and the auxiliary piston 31 to descend.

As explained through the above description of operation, this embodiment is advantageous in that the opening process is preceded by deflation buffering and followed by a fully opening process to optimize the effect of the deflation buffering. Furthermore, the disclosure is advantageous by providing a structure of joint operation of the stem 41, the auxiliary disc 42 and the main disc 51 to drive the auxiliary disc 42 and the main disc 51 separately to not only achieve structural simplicity and ease of assembly but also ensure that all the components of the two-way angle valve operate smoothly. By contrast, the aforesaid conventional two-way angle valve has a main stem and an auxiliary stem which have to be driven separately to the detriment of smooth operation of some components of the conventional two-way angle valve.

It is noteworthy that the upward-downward relation mentioned herein merely serves exemplary purposes but does not necessarily apply to any upward-downward relations shown in the accompanying drawings. In practice, the upward-downward relation mentioned herein may be interpreted as an upside-down orientation or a side-mounted orientation.

The disclosure is disclosed above by embodiments. The embodiments are illustrative of the disclosure but shall not be interpreted as restrictive of the scope of the claims of the disclosure. Thus, all simple variations or equivalent implementation of the aforesaid embodiments according to the claims and detailed description of the disclosure shall be deemed falling within the scope of the claims of the disclosure.

What is claimed is:

1. A two-way angle valve capable of buffering deflation, comprising:

a body having an inlet disposed below and an outlet disposed laterally;

a drive cylinder coupled to the body and disposed on the body;

a main piston driven to be vertically movably disposed in the drive cylinder, wherein an auxiliary drive cavity is concavely disposed at the main piston and extends in a top-to-bottom direction;

a drive air duct not only disposed at the drive cylinder so as to be in communication with an inside of the drive cylinder but also externally connected to a controlled gas source;

an auxiliary piston driven to be vertically movably disposed in the auxiliary drive cavity;

an auxiliary spring disposed in the drive cylinder, having two ends abutting against the drive cylinder and the auxiliary piston respectively, and generating a resilient restoring force under which the auxiliary piston is moved downward;

a stem having a top end fixedly disposed at the auxiliary piston, extending downward by a predetermined length, and moving vertically together with the auxiliary piston to penetrate the main piston and the drive cylinder to thereby move into the body, wherein an auxiliary disc is disposed at a bottom end of the stem;

an auxiliary drive air duct comprising an auxiliary channel penetrating the drive cylinder, a gap defined between the stem and the drive cylinder, and a stem air duct disposed in the stem, wherein the auxiliary channel, the gap, and the stem air duct are in communication with each other, the stem air duct being in communication with an inside of the auxiliary drive cavity, and the auxiliary channel being externally connected to an auxiliary controlled gas source;

a main disc having a chamber and a deflation buffering duct, the main disc having an upper abutting portion and a lower abutting portion, the upper abutting portion being disposed above the chamber, the lower abutting portion being disposed below the chamber and having a deflation buffering hole, the stem being inserted into the main disc to allow the auxiliary disc to be vertically movably disposed in the chamber, the deflation buffering duct having an end being in communication with the chamber and another end being defined as an opening formed on a lateral side of the main disc, thereby allowing the deflation buffering duct to be in communication with the outlet, and the deflation buffering hole being in communication with the inlet; and a main spring disposed in the body, fitted around the stem, having two ends abutting against the drive cylinder and the main disc respectively, and generating a resilient restoring force under which the main disc is moved downward, wherein the stem and the auxiliary disc move because of vertical movement of the auxiliary piston, wherein movement of the auxiliary piston and the main piston causes the stem to move between a lowest position and a highest position, wherein when the stem is at the lowest position, the auxiliary disc abuts against the lower abutting portion of the chamber to close the deflation buffering hole, and the main disc abuts against the body to close the inlet, disabling communication of the inlet and the outlet, wherein when the auxiliary disc has separated from the lower abutting portion but has not yet abutted against the upper abutting portion during an ascent of the stem from the lowest position, the outlet is in communication with the inlet through the deflation buffering duct, the chamber and the deflation buffering hole, wherein when the stem is at the highest position, the auxiliary disc abuts against the upper abutting portion of the chamber, and the main disc is lifted such that the inlet is not closed, enabling the communication of the inlet and the outlet.

2. The two-way angle valve capable of buffering deflation of claim 1, wherein the deflation buffering duct has a smaller diameter than the inlet.

3. The two-way angle valve capable of buffering deflation of claim 1, wherein the deflation buffering hole has a smaller diameter than the inlet.

4. The two-way angle valve capable of buffering deflation of claim 1, further comprising a resilient sealing pipe with two ends connected to the main disc and the body respectively to cover the stem and the main spring.

5. The two-way angle valve capable of buffering deflation of claim 1, wherein the drive cylinder comprises a lower block and an upper cylinder fitted together, with the body disposed at the lower block, allowing a drive cavity to be formed between the upper cylinder and the lower block and adapted to receive the main piston and the auxiliary spring, with the stem penetrating the lower block.

6. The two-way angle valve capable of buffering deflation of claim 5, wherein the drive air duct and the auxiliary channel are disposed at the lower block.

7. The two-way angle valve capable of buffering deflation of claim 6, wherein the lower block has an upper seal ring and a lower seal ring and is slidably fitted to the stem so as to allow a position of communication of the auxiliary channel and the gap to stay between the upper seal ring and the lower seal ring and allow a position of communication of the stem air duct and the gap to stay between the upper seal ring and the lower seal ring.

* * * * *